United States Patent
Ueno

(10) Patent No.: US 12,152,989 B2
(45) Date of Patent: Nov. 26, 2024

(54) MICROSCOPIC OBSERVATION APPARATUS, FLUORESCENCE DETECTOR, AND MICROSCOPIC OBSERVATION METHOD

(71) Applicant: IDDK CO., LTD., Tokyo (JP)

(72) Inventor: Soichiro Ueno, Tokyo (JP)

(73) Assignee: IDDK CO., LTD., Tokyo (JP)

( * ) Notice: Subject to any disclaimer, the term of this patent is extended or adjusted under 35 U.S.C. 154(b) by 719 days.

(21) Appl. No.: 17/256,789

(22) PCT Filed: Jul. 4, 2019

(86) PCT No.: PCT/JP2019/026698
§ 371 (c)(1),
(2) Date: Dec. 29, 2020

(87) PCT Pub. No.: WO2020/009197
PCT Pub. Date: Jan. 9, 2020

(65) Prior Publication Data
US 2021/0156803 A1     May 27, 2021

(30) Foreign Application Priority Data

Jul. 5, 2018  (JP) .................................. 2018-128249

(51) Int. Cl.
G01N 21/64   (2006.01)
G02B 21/06   (2006.01)

(52) U.S. Cl.
CPC ......... *G01N 21/6458* (2013.01); *G02B 21/06* (2013.01)

(58) Field of Classification Search
CPC ....... G01N 21/6458; G01N 2021/6465; G01N 2021/6478; G01N 21/645; G01N 21/27;
(Continued)

(56) References Cited

U.S. PATENT DOCUMENTS 5,206,699 A * 4/1993 Stewart .................. G01S 7/497
209/579
5,298,741 A * 3/1994 Walt ..................... A61B 5/0084
422/82.07

(Continued)

FOREIGN PATENT DOCUMENTS

JP   H07-49417 A   2/1995
JP   H11-166893 A  6/1999
(Continued)

OTHER PUBLICATIONS

International Search Report Issued in Patent Application No. PCT/JP2019/026698 dated Oct. 8, 2019.
(Continued)

*Primary Examiner* — Mohamed K Amara
(74) *Attorney, Agent, or Firm* — Pearne & Gordon LLP

(57) ABSTRACT

A microscopic observation apparatus that irradiates an observation target with excitation light to observe fluorescence generated from the observation target, the microscopic observation apparatus includes a light source that irradiates the observation target with excitation light; a first optical system that light-controls a plurality of light rays including fluorescence generated from the observation target by radiating the excitation light and part of the excitation light; a filter that reduces an intensity of light in a wavelength band of the excitation light among the plurality of light rays light-controlled by the first optical system; and a plurality of photoelectric conversion elements that converts a plurality of light rays that has passed through the filter into electricity.

7 Claims, 13 Drawing Sheets

(58) Field of Classification Search
CPC ... G01N 2021/1721; G01N 2021/6463; G01N 21/6428; G01N 2021/6419; G01N 2021/6421; G01N 2021/6441; G01N 2021/6471; G01N 21/6456; G01N 15/1475; G02B 21/06; G02B 21/16; G02B 21/00; G02B 13/22; G02B 21/002; G02B 21/02; G02B 21/082; G02B 21/22; G02B 21/361; G02B 26/008; G02B 3/08; G01J 3/26; G01J 3/32; G01J 3/51; H04N 23/55

See application file for complete search history.

(56) References Cited

U.S. PATENT DOCUMENTS

| | | | | |
|---|---|---|---|---|
| 5,315,418 | A * | 5/1994 | Sprague | G02F 1/13473 349/8 |
| 5,834,203 | A | 11/1998 | Katzir et al. | |
| 5,943,129 | A * | 8/1999 | Hoyt | G01N 21/6456 356/417 |
| 6,252,664 | B1 | 6/2001 | Barbera-Guillem | G01N 21/59 356/417 |
| 7,286,232 | B2 * | 10/2007 | Bouzid | G01N 21/6456 356/417 |
| 7,630,065 | B2 | 12/2009 | Suzuki et al. | |
| 8,421,903 | B2 * | 4/2013 | Wang | G01N 21/64 348/340 |
| 8,436,321 | B2 * | 5/2013 | Pieper | G01N 21/6456 250/458.1 |
| 8,681,247 | B1 * | 3/2014 | Pieper | G01N 21/6456 348/241 |
| 9,134,241 | B2 * | 9/2015 | Bouzid | G01N 21/6456 |
| 10,379,048 | B2 * | 8/2019 | Wang | G06F 3/0485 |
| 10,386,301 | B2 * | 8/2019 | Wang | G06T 1/0007 |
| 10,489,964 | B2 * | 11/2019 | Wang | G06F 3/04845 |
| 2004/0196457 | A1 * | 10/2004 | Aono | G02B 21/16 356/318 |
| 2005/0074784 | A1 * | 4/2005 | Vo-Dinh | G01N 21/6428 435/7.1 |
| 2005/0151972 | A1 * | 7/2005 | Boege | G01N 21/6452 356/417 |
| 2006/0221441 | A1 | 10/2006 | Zimmerman et al. | |
| 2007/0145236 | A1 * | 6/2007 | Kiesel | G01J 1/4228 356/226 |
| 2007/0188760 | A1 | 8/2007 | Bouzid | |
| 2008/0158566 | A1 | 7/2008 | Suzuki et al. | |
| 2009/0032731 | A1 * | 2/2009 | Kimura | G01N 21/6428 250/458.1 |
| 2009/0194705 | A1 * | 8/2009 | Kiesel | G01N 21/6486 250/459.1 |
| 2009/0296083 | A1 * | 12/2009 | Saaski | G01N 21/0303 356/246 |
| 2010/0165134 | A1 | 7/2010 | Dowski, Jr. et al. | |
| 2010/0202734 | A1 * | 8/2010 | DeCorby | G02B 6/1228 264/1.28 |
| 2010/0230580 | A1 * | 9/2010 | Matsumoto | G02B 7/28 250/208.1 |
| 2011/0299104 | A1 * | 12/2011 | Seo | G01J 3/513 358/1.9 |
| 2012/0287244 | A1 * | 11/2012 | Bennett | G02B 21/16 348/46 |
| 2014/0125981 | A1 | 5/2014 | Iga et al. | |
| 2015/0024968 | A1 * | 1/2015 | Rulison | G02B 5/045 506/12 |
| 2016/0054554 | A1 | 2/2016 | Tamano | |
| 2016/0161409 | A1 * | 6/2016 | Ozcan | G01N 21/6458 250/226 |
| 2017/0013212 | A1 * | 1/2017 | Tanaka | G02B 3/06 |
| 2017/0258331 | A1 * | 9/2017 | Tsumatori | G01N 21/359 |
| 2020/0103349 | A1 * | 4/2020 | Ota | G01N 21/6456 |
| 2021/0033837 | A1 * | 2/2021 | Dholakia | G02B 21/367 |
| 2021/0111668 | A1 * | 4/2021 | Sonwalkar | H02S 40/22 |
| 2021/0156803 | A1 * | 5/2021 | Ueno | G02B 21/16 |
| 2023/0118112 | A1 * | 4/2023 | Imai | G01N 15/1475 356/343 |

FOREIGN PATENT DOCUMENTS

| | | |
|---|---|---|
| JP | 2006-504989 A | 2/2006 |
| JP | 2006-195390 A | 7/2006 |
| JP | 2009-526993 A | 7/2009 |
| JP | 2009-533885 A | 9/2009 |
| JP | 4884369 B2 | 2/2012 |
| JP | 2012-150253 A | 8/2012 |
| JP | 2014-095594 A | 5/2014 |
| JP | 2016-045412 A | 4/2016 |
| JP | 2018-042283 A | 3/2018 |
| WO | 2006-088109 A1 | 8/2006 |

OTHER PUBLICATIONS

Written Opinion Issued in Patent Application No. PCT/JP2019/026698 dated Oct. 8, 2019.
Japanese Office Action issued Jan. 31, 2023 issued in Japanese Patent Application No. 2022-100261.
Japanese Office Action issued Aug. 8, 2023 issued in Japanese Patent Application No. 2022-100261.
Korean Patent Office Action for KR 10-2021-7003502 issued on Jul. 29, 2024.

* cited by examiner

MICROSCOPIC OBSERVATION APPARATUS, FLUORESCENCE DETECTOR, AND MICROSCOPIC OBSERVATION METHOD

TECHNICAL FIELD

The present invention relates to a microscopic observation apparatus, a fluorescence detector and a microscopic observation method.

BACKGROUND ART

Unlike conventional optical microscopes, an observation method has been proposed that allows easy observation of the entire observation target without the need for adjustment of the optical system such as imaging and scaling and scanning of the observation target (Patent Literature 1).

CITATION LIST

Patent Literature

Patent Literature 1: JP 2018-42283 A

SUMMARY OF INVENTION

Technical Problem

The observation method described in Patent Literature 1 does not assume that the observation target is irradiated with excitation light and the fluorescence from the observation target is observed.

The present invention has been made in view of such problems, and an object of the present invention is to provide a microscopic observation apparatus, a fluorescence detector and a microscopic observation method capable of easily observing the entire observation target by utilizing the fluorescence from the observation target irradiated with the excitation light.

Solution to Problem

A microscopic observation apparatus according to a first aspect of the present invention that irradiates an observation target with excitation light to observe fluorescence generated from the observation target, the microscopic observation apparatus comprises: a light source that irradiates the observation target with excitation light; a first optical system that light-controls a plurality of light rays including fluorescence generated from the observation target by radiating the excitation light and part of the excitation light; a filter that reduces an intensity of light in a wavelength band of the excitation light among the plurality of light rays light-controlled by the first optical system; and a plurality of photoelectric conversion elements that converts a plurality of light rays that has passed through the filter into electricity.

According to this configuration, the distance between the observation target and the photoelectric conversion element can be away by light-control with the first optical system and the second optical system. As a result, even when the observation target is thick in the vertical direction, there is enough space to manually or mechanically move the first optical system, the filter, the second optical system, and the photoelectric conversion element integrally in a direction substantially perpendicular to the incident face of a photoelectric conversion element 9, so that the fluorescence intensity distribution in the thickness direction of the observation target can be observed by moving and observing them. Further, the filter can reduce excitation light and transmit fluorescence among light rays light-controlled by the first optical system. In addition, since the photoelectric conversion element converts the light light-controlled by the second optical system into electricity, there is no trade-off between field of view and magnification, unlike conventional optical microscopes, and when a plurality of photoelectric conversion elements is densely disposed, a wide field of view can be observed at high magnification. Therefore, the entire observation target can be easily observed by utilizing the fluorescence from the observation target irradiated with the excitation light.

A microscopic observation apparatus according to a second aspect of the present invention, wherein the filter has an incident angle dependence in an optical characteristic, and an optical characteristic of the first optical system is set so that an incident angle of incident light on the filter falls at least within an allowable range of an incident angle at which transmittance of excitation light is equal to or less than a specified upper limit.

According to this configuration, the excitation light can be reduced by the filter so that the transmittance of the excitation light is equal to or less than the specified upper limit, so that the fluorescence can be observed.

A microscopic observation apparatus according to a third aspect of the present invention, the microscopic observation apparatus according to the first or second aspect of the information processing system, wherein in the first optical system, a focal length of the first optical system toward the observation target is set so that a distance between an end of the first optical system toward the observation target and the observation target is away by a set distance or more.

According to this configuration, even when the observation target T is thick in the vertical direction, the first optical system, the filter, the second optical system, and the photoelectric conversion element can be manually or mechanically moved integrally within a set distance (for example, 1 mm) in a direction substantially perpendicular to the incident face of the photoelectric conversion element, so that the fluorescence intensity distribution in the thickness direction of the observation target T can be observed.

A microscopic observation apparatus according to a forth aspect of the present invention, the microscopic observation apparatus according to any one of the first to third aspect of the microscopic observation apparatus, further comprises: a driving unit that moves the first optical system, the filter, and the photoelectric conversion element in a direction substantially perpendicular to an incident face of the photoelectric conversion element while maintaining a relative positional relationship between the first optical system, the filter, and the photoelectric conversion element.

According to this configuration, even when the observation target is thick in the vertical direction, the driving unit moves the photoelectric conversion element in a direction substantially perpendicular to the incident face of the photoelectric conversion element within a set distance (for example, 1 mm), so that the fluorescence intensity distribution in the thickness direction of the observation target can be observed.

A microscopic observation apparatus according to a fifth aspect of the present invention, the microscopic observation apparatus according to any one of the first to forth aspect of the microscopic observation apparatus, further comprises: a second optical system that light-controls a plurality of light rays after passing through the filter, wherein the plurality of photoelectric conversion elements converts the plurality of light rays light-controlled by the second optical system into electricity, and an optical characteristic of the second optical system is set so that an angle of light incident on the photoelectric conversion element falls within a set range in which a sensitivity of the photoelectric conversion element is equal to or greater than a specified lower limit.

According to this configuration, the sensitivity of the photoelectric conversion element is equal to or greater than the specified lower limit, so that observation can be performed with high sensitivity.

A microscopic observation apparatus according to a sixth aspect of the present invention, the microscopic observation apparatus according to the fifth aspect of the microscopic observation apparatus, wherein the second optical system includes a plurality of optical control members that light-controls light that has passed through the filter, and a plurality of viewing angle control layers on which light light-controlled by the plurality of optical control members is incident, that light-controls the incident light, the photoelectric conversion element photoelectrically converts light light-controlled by the viewing angle control layers, and an optical characteristic of the viewing angle control layers is set so that an angle of light incident on the photoelectric conversion element falls within the set range.

According to this configuration, the sensitivity of the photoelectric conversion element is equal to or greater than the specified lower limit, so that observation can be performed with high sensitivity.

A microscopic observation apparatus according to a seventh aspect of the present invention, the microscopic observation apparatus according to any one of the first to sixth aspect of the microscopic observation apparatus, wherein the filter is capable of electrically or mechanically controlling a wavelength characteristic of at least one of transmission, absorption, and reflection.

According to this configuration, the wavelength transmitted through the filter can be changed, so that the fluorescence wavelength to be observed can be changed.

A microscopic observation apparatus according to an eighth aspect of the present invention, the microscopic observation apparatus according to any one of the first to seventh aspect of the microscopic observation apparatus, wherein the first optical system controls a traveling angle of light so that the light narrows toward the filter, and an optical characteristic of the first optical system is set so that an incident angle of fluorescence in a targeted focus depth range of the observation target falls within an allowable range of an incident angle, and an incident angle of fluorescence in a range other than the targeted focus depth range of the observation target does not fall within the allowable range of the incident angle.

According to this configuration, it is possible to observe only the fluorescence in the targeted focus depth range of the observation target.

A fluorescence detector according to a ninth aspect of the present invention, the fluorescence detector used in a microscopic observation apparatus that irradiates an observation target with excitation light to observe fluorescence generated from the observation target, the fluorescence detector comprises: a first optical system that light-controls a plurality of light rays including fluorescence generated from the observation target by radiating the excitation light and part of the excitation light; a filter that reduces an intensity of light in a wavelength band of the excitation light among the plurality of light rays light-controlled by the first optical system; and a plurality of photoelectric conversion elements that converts a plurality of light rays that has passed through the filter into electricity.

A microscopic observation method according to a tenth aspect of the present invention, the microscopic observation method of irradiating an observation target with excitation light to observe fluorescence generated from the observation target, the microscopic observation method comprising: irradiating the observation target with excitation light from a light source; a first optical system light-controlling a plurality of light rays including fluorescence generated from the observation target by radiating the excitation light and part of the excitation light; a filter reducing an intensity of light in a wavelength band of the excitation light among the plurality of light rays light-controlled by the first optical system; and a plurality of photoelectric conversion elements converting a plurality of light rays passing through the filter into electricity.

A microscopic observation apparatus according to an eleventh aspect of the present invention, the microscopic observation apparatus that irradiates an observation target with excitation light to observe fluorescence generated from the observation target, the microscopic observation apparatus comprises: a light source that irradiates the observation target with excitation light; a filter that reduces an intensity of light in a wavelength band of the excitation light among light rays including fluorescence generated from the observation target by radiating the excitation light and part of the excitation light; a second optical system that light-controls a plurality of light rays after passing through the filter; and a plurality of photoelectric conversion elements that converts the plurality of light rays light-controlled by the second optical system into electricity, wherein an optical characteristic of the second optical system is set so that an angle of light incident on the photoelectric conversion element falls within a set range in which a sensitivity of the photoelectric conversion element is equal to or greater than a specified lower limit.

According to this configuration, the filter can reduce the excitation light and transmit the fluorescence, and the sensitivity of the photoelectric conversion element is equal to or greater than the specified lower limit, so that the observation can be performed with high sensitivity. In addition, since the photoelectric conversion element converts the light light-controlled by the second optical system into electricity, there is no trade-off between field of view and magnification, unlike conventional optical microscopes, and when a plurality of photoelectric conversion elements is densely disposed, a wide field of view can be observed at high magnification. Therefore, the entire observation target can be easily observed with high sensitivity by utilizing the fluorescence from the observation target irradiated with the excitation light.

A fluorescence detector according to a twelfth aspect of the present invention, the fluorescence detector used in a microscopic observation apparatus that irradiates an observation target with excitation light to observe fluorescence generated from the observation target, the fluorescence detector comprises: a filter that reduces an intensity of light in a wavelength band of excitation light among light rays including fluorescence generated from the observation target by radiating the excitation light from a light source and part of the excitation light; a second optical system that light-controls a plurality of light rays after passing through the filter; and a plurality of photoelectric conversion elements that converts the plurality of light rays light-controlled by the second optical system into electricity, wherein an optical characteristic of the second optical system is set so that an angle of light incident on the photoelectric conversion element falls within a set range in which a sensitivity of the photoelectric conversion element is equal to or greater than a specified lower limit.

A microscopic observation method according to a thirteenth aspect of the present invention, the microscopic observation method of irradiating an observation target with excitation light to observe fluorescence generated from the observation target, the microscopic observation method comprises: irradiating the observation target with excitation light from a light source; a filter reducing an intensity of light in a wavelength band of the excitation light among light rays including fluorescence generated from the observation target by radiating the excitation light from a light source and part of the excitation light; a second optical system light-controlling a plurality of light rays after passing through the filter; and a plurality of photoelectric conversion elements converting the plurality of light rays light-controlled by the second optical system into electricity, wherein an optical characteristic of the second optical system is set so that an angle of light incident on the photoelectric conversion element falls within a set range in which a sensitivity of the photoelectric conversion element is equal to or greater than a specified lower limit.

Advantageous Effects of Invention

According to an aspect of the present invention, the filter can reduce the excitation light and transmit the fluorescence. In addition, since the photoelectric conversion element converts light into electricity, there is no trade-off between field of view and magnification, unlike conventional optical microscopes, and when a plurality of photoelectric conversion elements is densely disposed, a wide field of view can be observed at high magnification. Therefore, the entire observation target can be easily observed by utilizing the fluorescence from the observation target irradiated with the excitation light.

DESCRIPTION OF EMBODIMENTS

Hereinafter, each embodiment will be described with reference to the drawings. However, detailed explanation more than necessary may be omitted. For example, detailed explanations of already well-known matters and redundant explanation on substantially the same configuration may be omitted. This is to avoid the unnecessary redundancy of the following description and to facilitate understanding by those skilled in the art.

Figure 1:
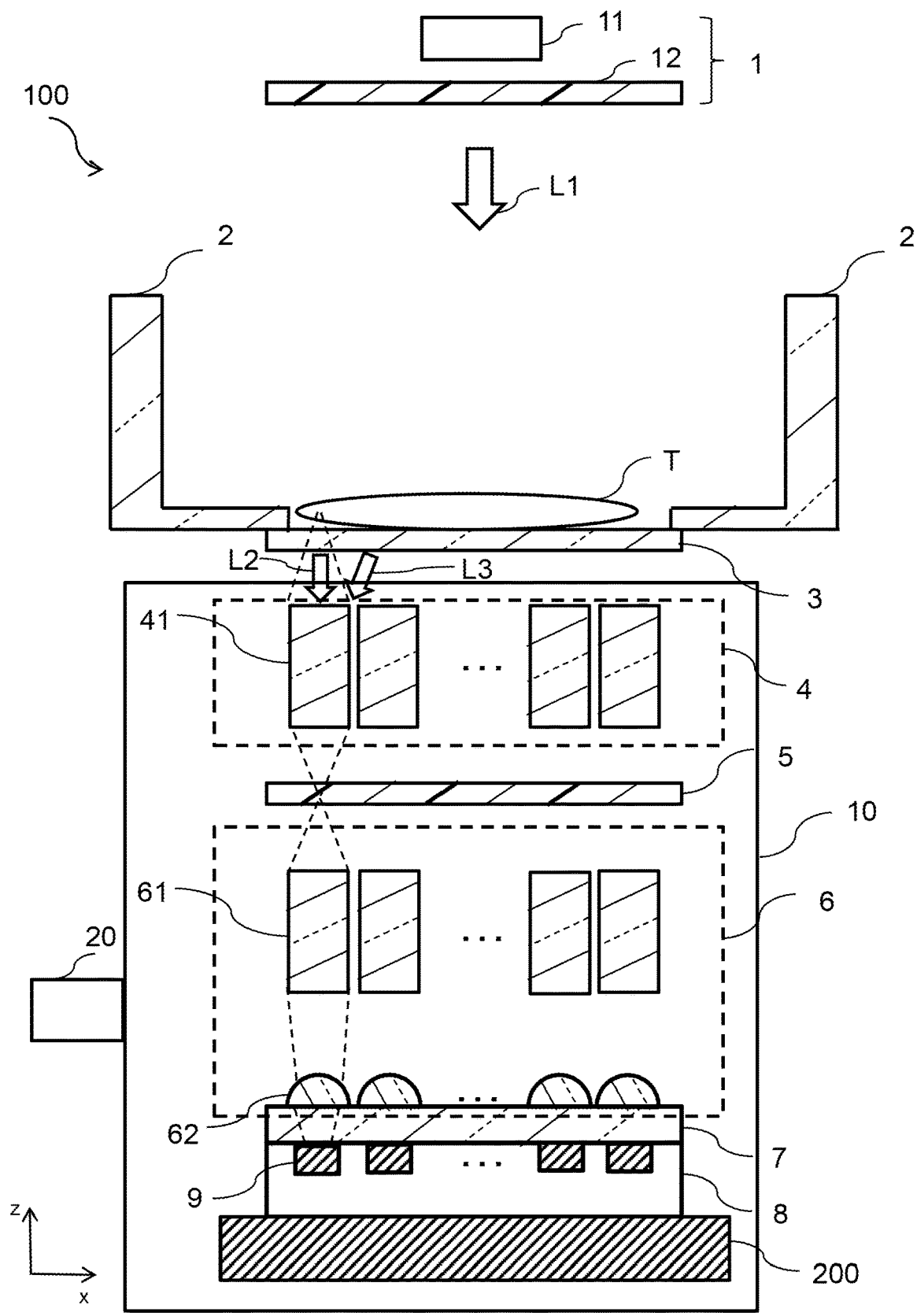
FIG. 1 is a schematic cross-sectional view of a microscopic observation apparatus according to a first embodiment.

FIG. 1 is a schematic cross-sectional view of a microscopic observation apparatus according to a first embodiment. A microscopic observation apparatus 100 irradiates an observation target T with excitation light from a light source 1 to observe fluorescence generated from the observation target. As shown in FIG. 1, the microscopic observation apparatus 100 includes the light source 1 and a fluorescence detector 10. The light source 1 irradiates the observation target T with excitation light, and has a light source main body 11 and a filter 12. The light source main body 11 emits light, and is, for example, a lamp or a laser. The filter 12 transmits almost only the wavelength band of the excitation light. A placement member 2 is, for example, a transparent container (dish) for placing cells, and the placement member 2 is provided with a substantially circular cavity as an example. A transparent member 3 is fixed to the back face of the placement member 2 so as to cover the cavity of the placement member 2 to transmit light, and is, for example, glass. For example, the observation target T is placed on the transparent member 3. The observation target T emits fluorescence when irradiated with excitation light, and is, for example, a cell expressing a fluorescent protein. In the present embodiment, as an example, fluorescence will be described below assuming that the fluorescence has a wavelength longer than that of the excitation light.

The light source 1 irradiates the observation target T with excitation light L1. The observation target T is excited by the excitation light L1 and emits fluorescence L2.

The fluorescence detector 10 includes a first optical system 4, a filter 5, a second optical system 6, an intermediate layer 7, a semiconductor substrate 8, and a plurality of photoelectric conversion elements 9 provided on the upper face of the semiconductor substrate 8. The first optical system 4 light-controls a plurality of light rays including the fluorescence L2 generated from the observation target by radiating the excitation light L1 and part of excitation light L3. Here, the light control includes control of the traveling angle of light (including focusing), light guide, or a combination thereof. In the present embodiment, an example of light guide will be described. Part of the excitation light L3 is light that has passed through around the observation target. The filter 5 reduces the intensity of light in the wavelength band of the excitation light among the plurality of light rays light-controlled by the first optical system 4. As an example, the filter 5 according to the present embodiment has an incident angle dependence in the optical characteristic, and is, for example, a dielectric multilayer filter. Here, the incident angle dependence of the optical characteristic is, for example, a characteristic in which the transmission band is driven to the shorter wavelengths as the incident angle of the incident light increases. Here, the incident angle of the incident light is the angle formed by the incident light and the normal line to the filter 5. The dielectric multilayer filter is a type in which a dielectric multilayer that functions as a filter is deposited on the surface of a substrate. The dielectric multilayer filter can selectively extract wavelengths by the interference effect of light. The dielectric multilayer filter has a feature of showing a rapid rise (or fall) of pass/cut in the graph of spectral transmission characteristics.

The filter 5 may be electrically or mechanically capable of controlling the wavelength characteristic of at least one of transmission, absorption, and reflection. For example, the filter 5 is a liquid crystal tunable filter or Fabry-Perot filter. The liquid crystal tunable filter can electrically change the transmission wavelength, and the Fabry-Perot filter can mechanically change the transmission wavelength.

The second optical system 6 light-controls a plurality of light rays after passing through the filter 5. The second optical system 6 may be achieved by controlling the traveling angle of light (including focusing) or by combining the light guide. In the present embodiment, an example of light guide will be described.

The photoelectric conversion element 9 converts a plurality of light rays light-controlled by the second optical system 6 into electricity, and is, for example, a photodiode.

Figure 2A:
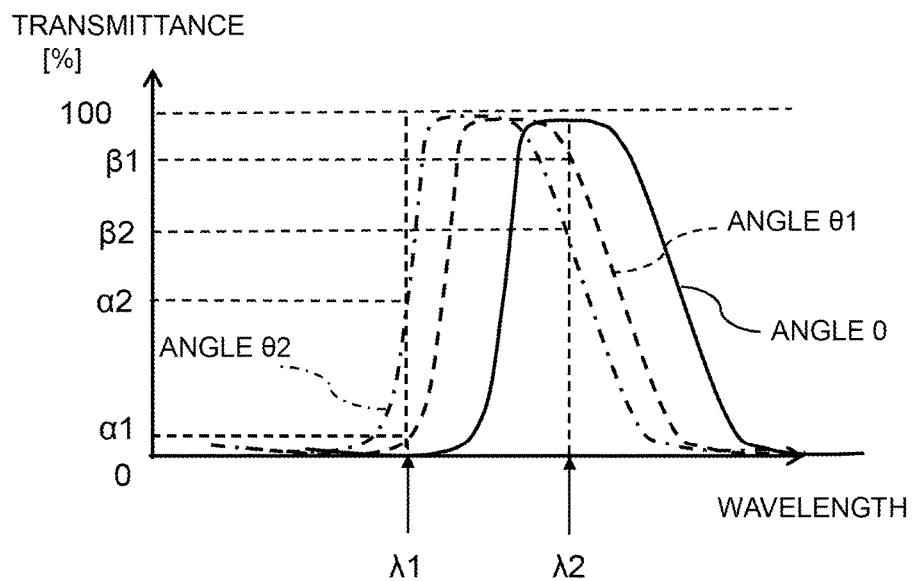
FIG. 2A is a graph showing an example of the relationship between the transmittance and the wavelength of the filter 5.

FIG. 2A is a graph showing an example of the relationship between the transmittance and the wavelength of the filter 5. In FIG. 2A, the vertical axis represents the transmittance and the horizontal axis represents the wavelength. In FIG. 2A, a graph in which the incident angle of the incident light on the filter 5 is 0 and a graph in which the incident angle of the incident light on the filter 5 is θ1 are shown. When the incident angle is 0, since the transmittance of the filter 5 is almost 0% at the wavelength λ1 of the excitation light, the excitation light is cut by the filter 5, but since the transmittance of the filter 5 is almost 100% at the wavelength λ2 of the fluorescence, which is longer than the wavelength λ1 of the excitation light, the fluorescence passes through the filter 5.

On the other hand, when the incident angle is θ1 greater than 0, since the transmittance of the filter 5 is α1%, which is greater than 0%, at the wavelength λ1 of the excitation light, most of the excitation light is cut by the filter 5, but since the transmittance of the filter 5 is β1%, which lower than 100%, at the wavelength λ2 of the fluorescence, most of the fluorescence passes through the filter 5.

Also, for example, when the incident angle is θ2, which is greater than θ1, since the transmittance of the filter 5 is α2%, which is greater than α1%, at the wavelength λ1 of the excitation light, only about half of the excitation light is cut by the filter 5, and the transmittance of the filter 5 is β2%, which is lower than β1%, at the wavelength λ2 of the fluorescence, so that the intensity of the fluorescence decreases as it passes through the filter 5.

Figure 2B:
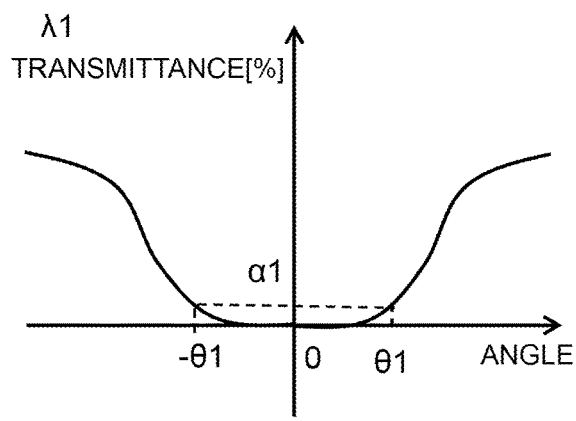
FIG. 2B is a graph showing an example of the relationship between the transmittance of the filter 5 and the incident angle of the incident light at the wavelength λ1 of the excitation light.

FIG. 2B is a graph showing an example of the relationship between the transmittance of the filter 5 and the incident angle of the incident light at the wavelength λ1 of the excitation light. In FIG. 2B, the vertical axis represents the transmittance and the horizontal axis represents the incident angle of the incident light. When the incident angle of the incident light on the filter 5 is θ1, the transmittance of the filter 5 is 60 1, which is greater than 0%. As shown in FIG. 2B, the greater the incident angle of the incident light, the greater the transmittance of the excitation light.

When the observation method described in Patent Literature 1 is used as it is for the fluorescence observation, for the filter having an incident angle dependence in the optical characteristic (for example, the dielectric multilayer filter), since the transmission band is driven to the shorter wavelengths as the incident angle of the incident light increases, so that depending on the angle of the incident light, the filter 5 cannot sufficiently cut the excitation light, which enters the photodiode. In this case, since the incident light usually has a higher intensity than the fluorescence, there is a problem that it is not possible to extract the fluorescence alone, and the fluorescence from the observation target cannot be observed.

On the other hand, in the present embodiment, assuming that α1% is the upper limit of the transmittance of excitation light, the range of incident angle −θ1 to θ1 is defined so that the incident angle of the incident light on the filter 5 is set to be equal to or less than the upper limit α1% of the transmittance of the excitation light. That is, the optical characteristic of the first optical system 4 is set so that the incident angle of the incident light on the filter 5 falls at least within the allowable range of the incident angle at which the transmittance of the excitation light is equal to or less than the specified upper limit. As a result, the excitation light can be reduced by the filter 5 so that the transmittance of the excitation light is equal to or less than the specified upper limit, so that the fluorescence can be observed.

Figure 2C:
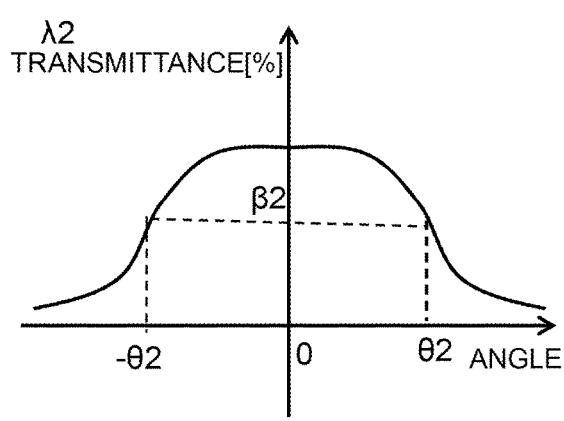
FIG. 2C is a graph showing an example of the relationship between the transmittance of the filter 5 and the incident angle of the incident light at the wavelength λ2 of the fluorescence.

FIG. 2C is a graph showing an example of the relationship between the transmittance of the filter 5 and the incident angle of the incident light at the wavelength λ2 of the fluorescence. In FIG. 2C, the vertical axis represents the transmittance and the horizontal axis represents the incident angle of the incident light. When the incident angle of the incident light on the filter 5 is θ2, the transmittance of the filter 5 is β2%, which is lower than β1%. As shown in FIG. 2C, the larger the incident angle of the incident light, the smaller the transmittance of the fluorescence.

When the observation method described in Patent Literature 1 is used as it is for the fluorescence observation, for the filter having an incident angle dependence in the optical characteristic (for example, the dielectric multilayer filter), since the transmission band is driven to the shorter wavelengths as the incident angle of the incident light increases, the filter reduces the intensity of the fluorescence to a large extent depending on the angle of the incident light, so that the fluorescence cannot sufficiently enters the photodiode. In this case, there is a problem that the fluorescence intensity is not sufficient and the fluorescence from the observation target cannot be observed with sufficient brightness.

On the other hand, in the present embodiment, assuming that β2% is the lower limit of the transmittance of the fluorescence, the range of incident angle $-\theta 2$ to $\theta 2$ is defined so that the incident angle of the incident light on the filter 5 is equal to or greater than the lower limit β% of the transmittance of the fluorescence.

In this way, as an example in the present embodiment, in the incident angle of the incident light on the filter 5, $-\theta 1$ to $\theta 1$, which is a range in which the range of the incident angle $-\theta 1$ to $\theta 1$ and the range of the incident angle $-\theta 2$ to $\theta 2$ overlap, is defined as the allowable range of the incident angle so that the transmittance of the excitation light is equal to or less than the specified upper limit α1% and the transmittance of the fluorescence is equal to or greater than the specified lower limit β2%.

In this way, since the filter 5 has an incident angle dependence in the optical characteristic, the optical characteristic of the first optical system 4 is set so that the incident angle of the light incident on the filter 5 falls at least within the allowable range of the incident angle at which the transmittance of the excitation light is equal to or less than the specified upper limit α1%. The allowable range of the incident angle is preferably a range in which the transmittance of the excitation light is equal to or less than the specified upper limit α1% and the transmittance of the fluorescence is equal to or greater than the specified lower limit β2%. In the present embodiment, this preferred aspect will be described. With this configuration, the filter 5 can reduce the excitation light and transmit the fluorescence among light rays light-controlled by the first optical system 4. Therefore, the entire observation target can be easily observed by utilizing the fluorescence from the observation target irradiated with the excitation light.

The first optical system 4 has a plurality of SELFOCK lenses 41, and the plurality of SELFOCK lenses 41 guides a plurality of light rays including the fluorescence and part of the excitation light. Unlike spherical lenses, the configuration does not require a plurality of layers of lenses by guiding the light rays with the SELFOCK lenses 41, making it possible to reduce the size and cost to obtain an even image and light amount over the entire width.

In the first optical system 4, the focal length of the first optical system 4 toward the observation target is set so that the distance between the end of the first optical system 4 toward the observation target and the observation target T is away by a set distance (for example, 1 mm) or more. Here, specifically, the focal length of the SELFOCK lens 41 toward the observation target is set so that the distance between the end of the SELFOCK lens 41 toward the observation target and the observation target T is away by a set distance (for example, 1 mm) or more.

According to this configuration, even when the observation target T is thick in the vertical direction, the entire fluorescence detector 10 can be manually or mechanically moved within a set distance (for example, 1 mm) in a direction (z direction in FIG. 1) substantially perpendicular to the incident face of the photoelectric conversion element 9, so that the fluorescence intensity distribution in the thickness direction of the observation target T can be observed.

A driving unit 20 moves the entire fluorescence detector 10 in the vertical direction (z direction in FIG. 1). That is, the driving unit 20 moves the first optical system 4, the filter 5, the second optical system 6, and the photoelectric conversion element 9 in a direction substantially perpendicular to the incident face of the photoelectric conversion element 9 while maintaining their relative positional relationship. The driving unit 20 may be, for example, an actuator used for camera focus, a voice coil system, a piezo system, or an artificial muscle system.

According to this configuration, even when the observation target T is thick in the vertical direction, the driving unit 20 moves the entire fluorescence detector 10 within a set distance (for example, 1 mm) in a direction (z direction in FIG. 1) substantially perpendicular to the incident face of the photoelectric conversion element 9, so that the fluorescence intensity distribution in the thickness direction of the observation target T can be observed.

Figure 3:
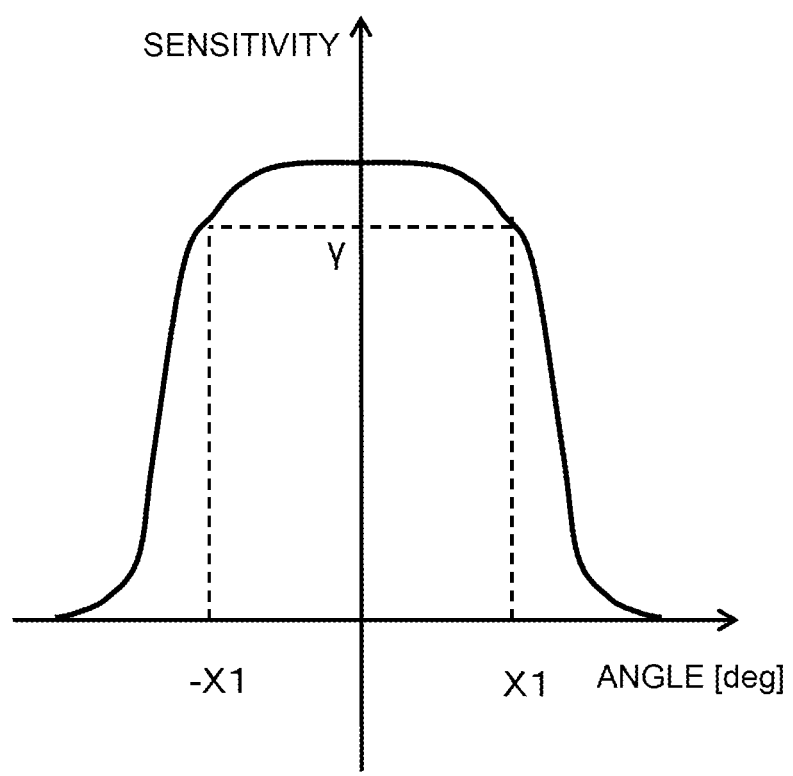
FIG. 3 is a diagram showing an example of the characteristic of the photoelectric conversion element 9.

FIG. 3 is a diagram showing an example of the characteristic of the photoelectric conversion element 9. In FIG. 3, the vertical axis represents the sensitivity and the horizontal axis represents the incident angle of the light incident on the photoelectric conversion element 9. Here, the incident angle of the light incident on the photoelectric conversion element 9 is an angle formed by the incident light and the normal line to the photoelectric conversion element 9. When the incident angle of the light incident on the photoelectric conversion element 9 is within the set range (here, for example, $-X1$ to $X1$ [deg]), the sensitivity is equal to or greater than the specified lower limit γ of the sensitivity of the photoelectric conversion element 9 (for example, a level lowered by 3 dB from the peak sensitivity). That is, the optical characteristic of the second optical system 6 is set so that the angle of the light incident on the photoelectric conversion element falls within the set range in which the sensitivity of the photoelectric conversion element is equal to or greater than the specified lower limit γ.

As shown in FIG. 1, the second optical system 6 includes a plurality of optical control members 61 that light-controls the light that has passed through the filter 5, and a plurality of viewing angle control layers 62 that controls the traveling angle of the incident light so that the light light-controlled by the plurality of optical control members 61 is incident and falls within a predetermined viewing angle. The viewing angle control layer is, for example, a microlens. The viewing angle control layer is not limited to a microlens, but may be a metamaterial lens, a Fresnel lens, a waveguide structure, a pinhole, or the like, as long as the viewing angle can be controlled. The plurality of photoelectric conversion elements 9 photoelectrically converts the light that has passed through the viewing angle control layer 62. The optical characteristic of the viewing angle control layer 62 is set so that the angle of the light incident on the photoelectric conversion element 9 falls within the set range (for example, $-X1$ to $X1$ [deg] in FIG. 3) in which the sensitivity of the photoelectric conversion element is equal to or greater than the specified lower limit γ.

With this configuration, in the photoelectric conversion element 9, the sensitivity of the photoelectric conversion element is equal to or greater than the specified lower limit, so that it is possible to perform observation with high sensitivity.

In the present embodiment, the optical control member 61 is a SELFOCK lens as an example. Unlike spherical lenses, this configuration does not require a plurality of layers of lenses or an inversion mirror since the optical control member 61 is a SELFOCK lens, making it possible to reduce the size and cost to obtain an even image and light amount over the entire width.

Figure 4A:
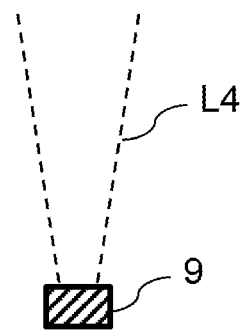
FIG. 4A is a first example of a luminous flux incident on the photoelectric conversion element 9.
Figure 4B:
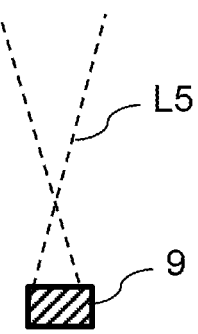
FIG. 4B is a second example of the luminous flux incident on the photoelectric conversion element 9.

FIG. 4A is a first example of a luminous flux incident on the photoelectric conversion element 9. FIG. 4B is a second example of the luminous flux incident on the photoelectric conversion element 9. Since the photoelectric conversion element 9 is an element that converts light into electrons, it is not necessary to form an image with the photoelectric conversion element 9, and it is enough to keep the angle of the light incident on the photoelectric conversion element 9 within the set range (for example, −X1 to X1 [deg] in FIG. 3). Therefore, the luminous flux incident on the photoelectric conversion element 9 may be a luminous flux L4 incident on the photoelectric conversion element 9 without forming an image as shown in FIG. 4A, or as shown in FIG. 4B, may be a luminous flux L5 that is once focused on one point, then spreads and is incident on the photoelectric conversion element 9.

Figure 5:
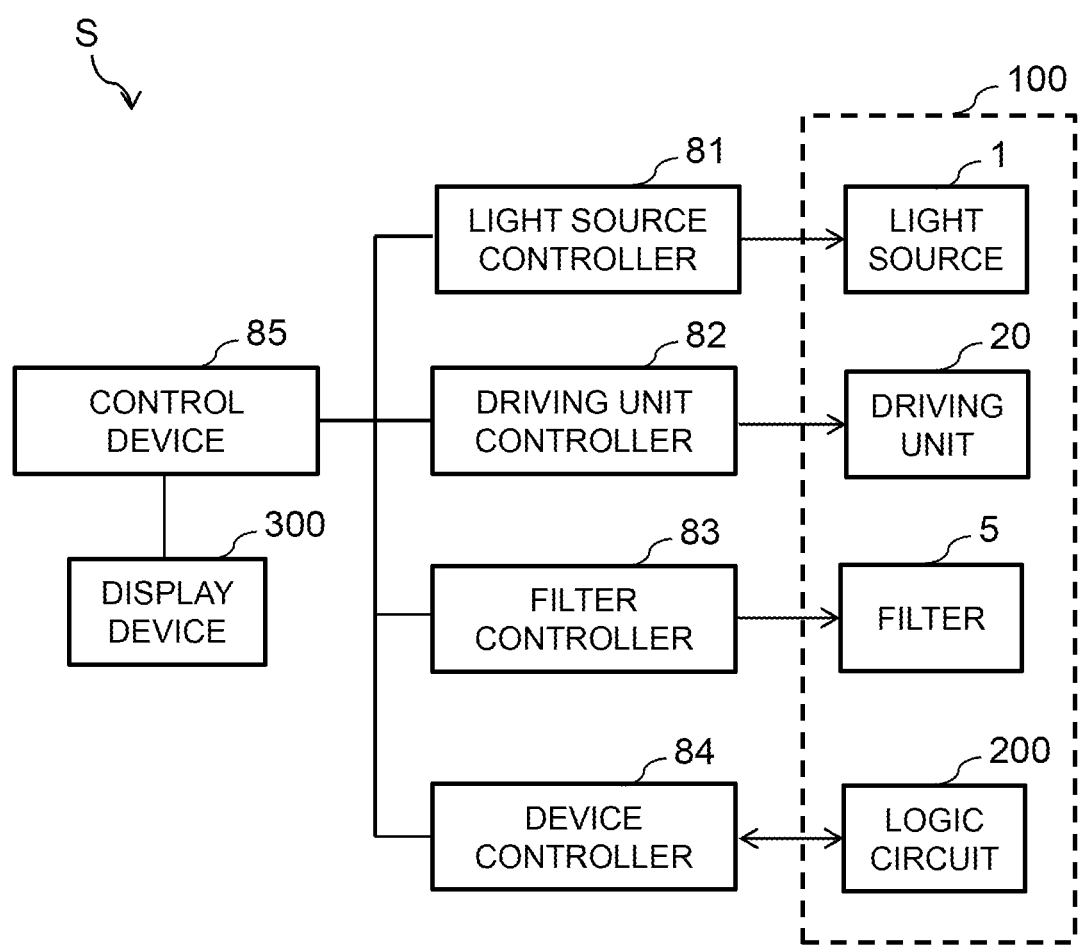
FIG. 5 is a block diagram showing an example of the configuration of a microscopic observation system including the microscopic observation apparatus according to the first embodiment.

FIG. 5 is a block diagram showing an example of the configuration of a microscopic observation system including the microscopic observation apparatus according to the first embodiment. As shown in FIG. 5, a microscopic observation system S includes the microscopic observation apparatus 100, a light source controller 81, a driving unit controller 82, a filter controller 83, a device controller 84, a control device 85, a logic circuit 200, and a display device 300 connected to the control device 85.

The light source controller 81 adjusts the excitation wavelength and the excitation intensity of the light source 1. The driving unit controller 82 controls the driving unit 20 to move the focal plane and adjusts the shooting position. The filter controller 83 sets the wavelength transmitted through the filter 5 (that is, the fluorescence wavelength to be observed). The device controller 84 controls the logic circuit 200 to set shooting conditions (gain, exposure, frame rate, etc.). Here, the logic circuit 200 is a signal processing circuit, and a detailed description thereof will be described later with reference to FIG. 6.

The control device 85 controls the light source controller 81, the driving unit controller 82, the filter controller 83, and the device controller 84. The control device 85 is, for example, a personal computer (PC) or a microcomputer. The operations of the light source controller 81 to the device controller 84 can be performed in no particular order, and desired fluorescence observation can be performed by changing these settings.

Figure 6:
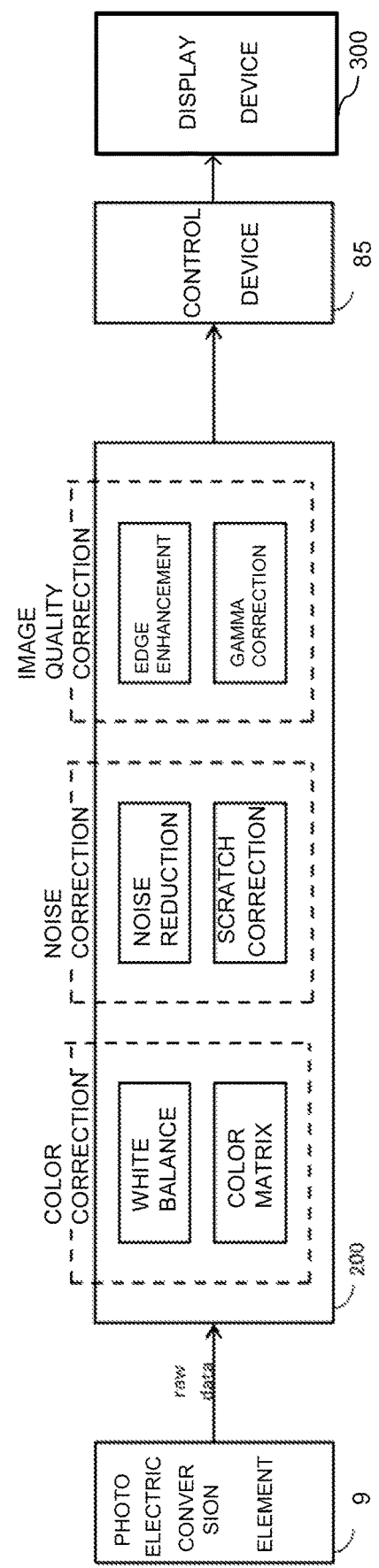
FIG. 6 is a block diagram showing an example of the configuration of the logic circuit according to the first embodiment.

FIG. 6 is a block diagram showing an example of the configuration of the logic circuit according to the first embodiment. The logic circuit 200 performs predetermined signal processing such as a color correction (white balance, color matrix), a noise correction (noise reduction, scratch correction), an image quality correction (edge enhancement, gamma correction), and the like on the voltage signal (raw data) obtained by photoelectric conversion by the photoelectric conversion element 9 of the microscopic observation apparatus 100 to output the signal-processed voltage signal to the control device 85 as an image signal. The control device 85 outputs this image signal to the display device 300. This allows the operator to observe the image after signal processing. Note that some or all of the functions of the logic circuit 200 may be executed by the control device 85.

In the present embodiment, since the microscopic observation apparatus 100 does not include a lens system for imaging or scaling, there is no need for the logic circuit 200 to have a correction circuit for correcting such a lens aberration or a shading correction.

For example, in the semiconductor substrate 8, such a logic circuit 200 may be built in the fluorescence detector 10 around the region where the photoelectric conversion element 9 (specifically, a photodiode) is formed, or it may be provided on a substrate separate from the fluorescence detector 10 and may be a separate component from the fluorescence detector 10.

Further, the display device 300 forms and displays an image of the observation target T based on the image signal output from the logic circuit 200. The display device 300 can display the entire observation target T disposed on the transparent member 3 in real time at one time.

As described above, the microscopic observation apparatus 100 according to the first embodiment irradiates the observation target with excitation light and observes the fluorescence generated from the observation target. The microscopic observation apparatus 100 includes the light source 1 that irradiates an observation target with excitation light, the first optical system 4 that light-controls a plurality of light rays including fluorescence generated from the observation target by radiating the excitation light and part of the excitation light, the filter 5 that reduces the intensity of light in the wavelength band of the excitation light among the plurality of light rays light-controlled by the first optical system 4, and the plurality of photoelectric conversion elements 9 that converts a plurality of light rays after passing through the filter 5 into electricity. The optical characteristic of the first optical system 4 is set so that the incident angle of fluorescence on the filter 5 falls within the allowable range of the incident angle.

With this configuration, the filter 5 can reduce the excitation light and transmit the fluorescence among light rays light-controlled by the first optical system 4. In addition, since the photoelectric conversion element 9 converts light into electricity, there is no trade-off between field of view and magnification, unlike conventional optical microscopes, and when the plurality of photoelectric conversion elements 9 is densely disposed, a wide field of view can be observed at high magnification. Therefore, the entire observation target can be easily observed by utilizing the fluorescence from the observation target irradiated with the excitation light. Further, with the configuration of the present embodiment, not only fluorescence observation but also transmitted light observation can be performed.

Second Embodiment

Next, a second embodiment will be described. The microscopic observation apparatus according to the second embodiment has a different configuration of the fluorescence detector from the microscopic observation apparatus according to the first embodiment.

Figure 7:
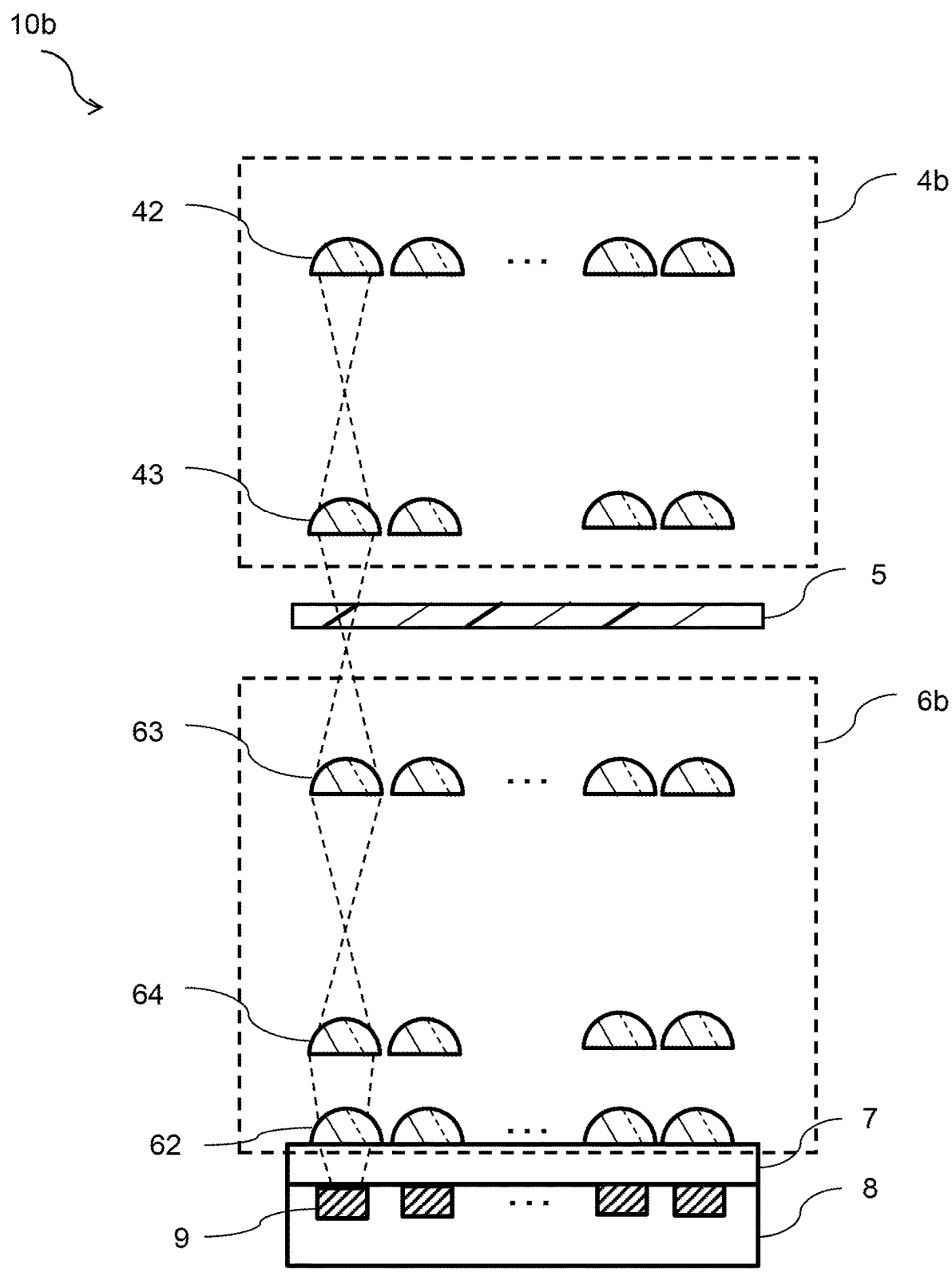
FIG. 7 is a schematic cross-sectional view of a fluorescence detector 10b of the microscopic observation apparatus according to the second embodiment.

FIG. 7 is a schematic cross-sectional view of a fluorescence detector 10b of the microscopic observation apparatus according to the second embodiment. As shown in FIG. 7, compared with the fluorescence detector 10 of the microscopic observation apparatus according to the first embodiment, the fluorescence detector 10b of the microscopic observation apparatus according to the second embodiment has a configuration in which the first optical system 4 is changed to a first optical system 4b, and the second optical system 6 is changed to a second optical system 6b.

It has the first optical system 4b, a plurality of lenses 42, and a plurality of lenses 43. The lens 42 light-controls light rays including the fluorescence generated from the observation target T and part of the excitation light. In the present embodiment, the light control is, for example, the control of the traveling angle of light. The lens 42 controls the traveling angle of the light to spread the light. The lens 43 again controls the traveling angle of the light spread by the lens 42 to narrow the light. The optical characteristic of the lens 43 is set so that the incident angle of fluorescence on the filter 5 falls within the allowable range of the incident angle. As a result, the filter 5 can reduce the excitation light and transmit the fluorescence among light rays whose traveling angle is controlled by the lens 43. Furthermore, as mentioned above, by controlling the traveling angle of light by the lens 43, it is possible that the incident angle of the fluorescence in the targeted focus depth range of the observation target falls within the allowable range of the incident angle, and the incident angle of the fluorescence in a range other than the targeted focus depth range of the observation target does not fall within the allowable range of the incident angle. As a result, since the filter 5 transmits only the fluorescence in the targeted focus depth range of the observation target, the fluorescence of the targeted focus depth range of the observation target can be observed.

Here, an example in which the traveling angle of light is controlled by the lens 43 has been described, but the optical configuration is not limited to this. The first optical system 4 may control the traveling angle of the light with other optical configurations so that the light narrows toward the filter 5. In this case, the optical characteristic of the first optical system 4 is set so that the incident angle of the fluorescence in the targeted focus depth range of the observation target falls within the allowable range of the incident angle, and the incident angle of the fluorescence in a range other than the targeted focus depth range of the observation target does not fall within the allowable range of the incident angle. As a result, it is possible to observe only the fluorescence in the targeted focus depth range of the observation target.

The second optical system 6b has a plurality of lenses 63, a plurality of lenses 64, and the plurality of viewing angle control layers 62. The lens 63 controls the traveling angle of light after passing through the filter 5 in a narrowing direction. The lens 64 controls the traveling angle of the light spread by the lens 63 in a narrowing direction. The viewing angle control layer 62 controls the traveling angle of the light incident through the lens 64 so that the angle falls within a predetermined viewing angle. Here, as in the first embodiment, the optical characteristic of the viewing angle control layer 62 is set so that the angle of the light incident on the photoelectric conversion element 9 falls within the set range. With this configuration, in the photoelectric conversion element 9, the sensitivity of the photoelectric conversion element is equal to or greater than the specified lower limit, so that it is possible to perform observation with high sensitivity.

Modification of Second Embodiment

Figure 8:
FIG. 8 is a schematic cross-sectional view of a fluorescence detector 10b2 of the microscopic observation apparatus according to the modification of the second embodiment.

In the second embodiment described above, an example of controlling the traveling angle of the light in a direction in which the angle is narrowed by each lens is described, but the present invention is not limited to this. As shown in FIG. 8, the light may be guided by each lens. FIG. 8 is a schematic cross-sectional view of a fluorescence detector 10b2 of the microscopic observation apparatus according to the modification of the second embodiment. Compared with the fluorescence detector 10b of the second embodiment of FIG. 7, the fluorescence detector 10b2 has a configuration in which the first optical system 4b is changed to a first optical system 4b2, and the second optical system 6b is changed to a second optical system 6b2.

The first optical system 4b2 has a lens 42b, a lens 421, and a lens 43b. The lens 42 guides the light rays including the fluorescence generated from the observation target T and part of the excitation light to the lens 421. The lens 421 transmits the light incident through the lens 42 as parallel light. The lens 43b transmits the light incident through the lens 421 in parallel. As a result, since the light entering the filter 5 is perpendicular to the filter 5, the transmission band is no driven to the shorter wavelengths, so that the filter 5 can reduce the excitation light and transmit the fluorescence among incident light rays.

The second optical system 6b2 has a lens 63b, a lens 631, a lens 64, and the viewing angle control layer 62. The lens 63b guides the light that has passed through the filter 5 to the lens 631. The lens 631 transmits the light incident through the lens 63 as parallel light. The lens 64b guides the light incident through the lens 631 to the viewing angle control layer 62. Further, the viewing angle control layer 62 narrows down the light incident through the lens 631. Here, as in the first and second embodiments, the optical characteristic of the viewing angle control layer 62 is set so that the angle of the light incident on the photoelectric conversion element 9 falls within the set range. With this configuration, in the photoelectric conversion element 9, the sensitivity of the photoelectric conversion element is equal to or greater than the specified lower limit, so that it is possible to perform observation with high sensitivity.

Third Embodiment

Next, a third embodiment will be described. The microscopic observation apparatus according to the third embodiment has a different configuration of the first optical system from the microscopic observation apparatus according to the first embodiment.

Figure 9:
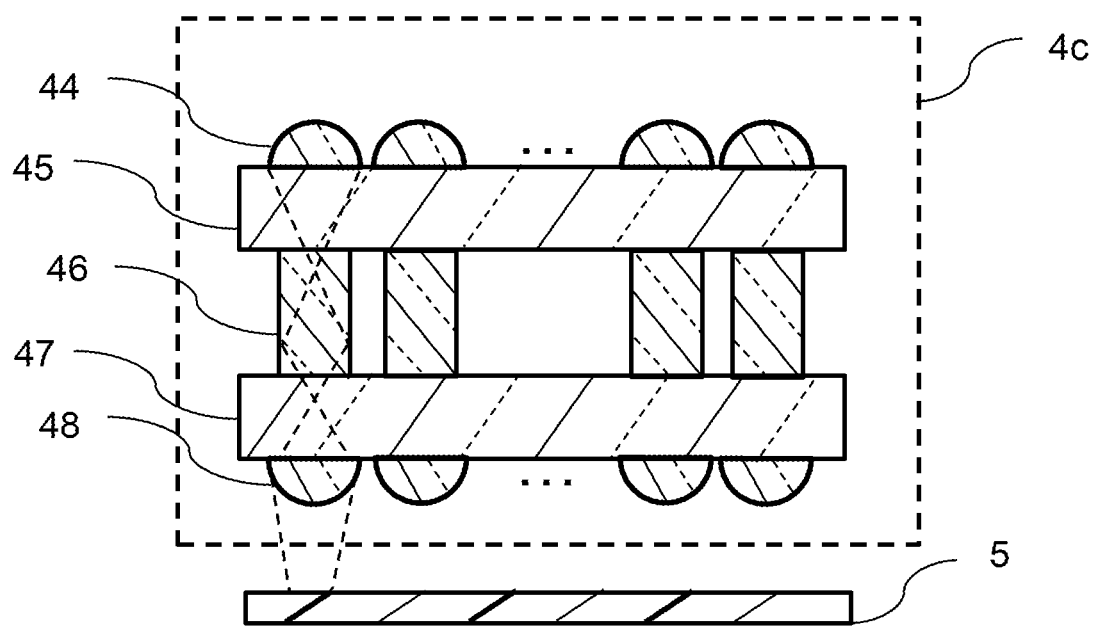
FIG. 9 is a schematic cross-sectional view of a first optical system 4c of the microscopic observation apparatus according to the third embodiment.

FIG. 9 is a schematic cross-sectional view of a first optical system 4c of the microscopic observation apparatus according to the third embodiment. As shown in FIG. 9, the first optical system 4c has a flat layer 45, a plurality of lenses 44 provided on the flat layer 45, a flat layer 47, a plurality of waveguides 46 provided on the flat layer 47, and a plurality of lenses 48 provided on the lower face of the flat layer 47. Here, the waveguide 46 is also referred to as an intralayer lens.

The lens 44 controls the traveling angle of the light rays including the fluorescence generated from the observation target T and part of the excitation light in a narrowing direction.

The waveguide 46 guides light passing through the lens 44 and the flat layer 45.

The lens 48 controls the traveling angle of light passing through the waveguide 46 and the flat layer 47 in a narrowing direction. As a result, the light that has passed through the lens 48 is incident on the filter 5. The optical characteristic of the lens 48 is set so that the incident angle of fluorescence on the filter 5 falls within the allowable range of the incident angle. As a result, the filter 5 can reduce the excitation light and transmit the fluorescence among light rays controlled in the direction of narrowing the traveling angle by the lens 48.

Fourth Embodiment

Next, a fourth embodiment will be described. The microscopic observation apparatus according to the fourth embodiment has a different configuration of the first optical system from the microscopic observation apparatus according to the first embodiment.

Figure 10:
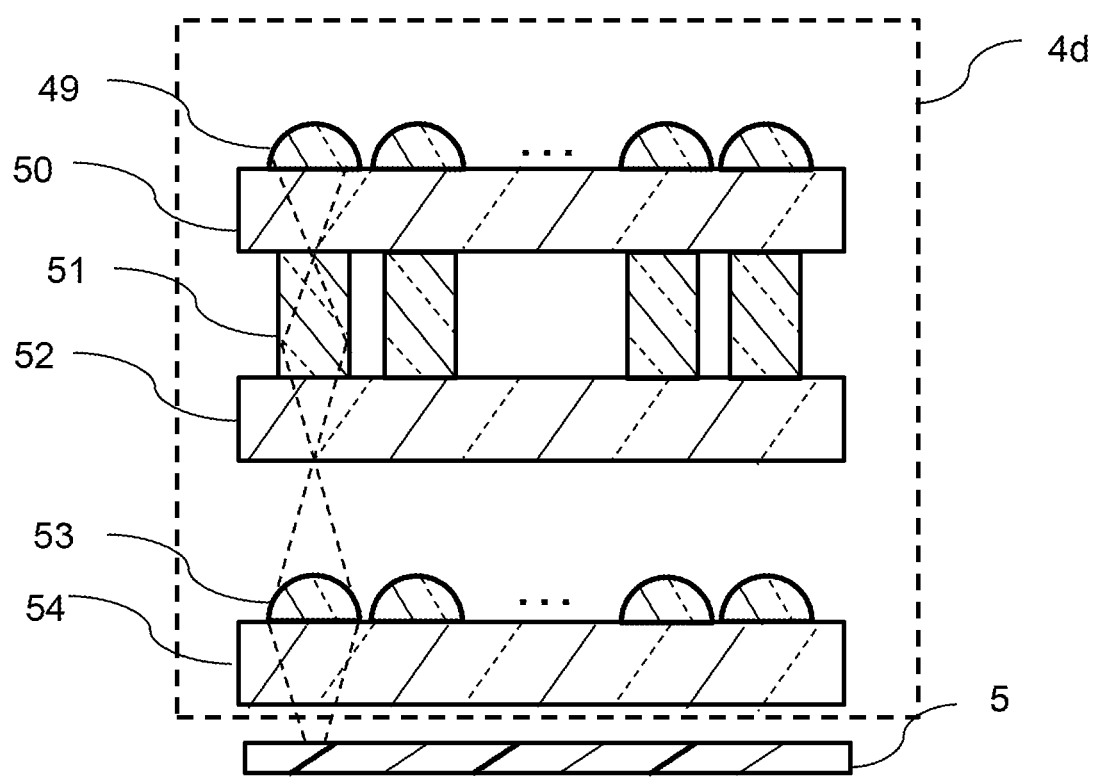
FIG. 10 is a schematic cross-sectional view of a first optical system 4d of the microscopic observation apparatus according to the fourth embodiment.

FIG. 10 is a schematic cross-sectional view of a first optical system 4d of the microscopic observation apparatus according to the fourth embodiment. As shown in FIG. 10, the first optical system 4d has a flat layer 50, a plurality of lenses 49 provided on the flat layer 50, a flat layer 52, a plurality of waveguides 51 provided on the flat layer 52, a flat layer 54, and a plurality of lenses 53 provided on the flat layer 54. Here, the waveguide 51 is also referred to as an intralayer lens.

The lens 49 controls the traveling angle of the light rays including the fluorescence generated from the observation target T and part of the excitation light in a narrowing direction. The waveguide 51 guides light passing through the lens 49 and the flat layer 50. The lens 53 controls the traveling angle of light passing through the waveguide 51 and the flat layer 52 in a narrowing direction. As a result, the light that has passed through the lens 53 is incident on the filter 5 through the flat layer 54. The optical characteristic of the lens 53 is set so that the incident angle of fluorescence on the filter 5 falls within the allowable range of the incident angle. As a result, the filter 5 can reduce the excitation light and transmit the fluorescence among light rays controlled in the direction of narrowing the traveling angle by the lens 53.

Modification of Fourth Embodiment

Figure 11:
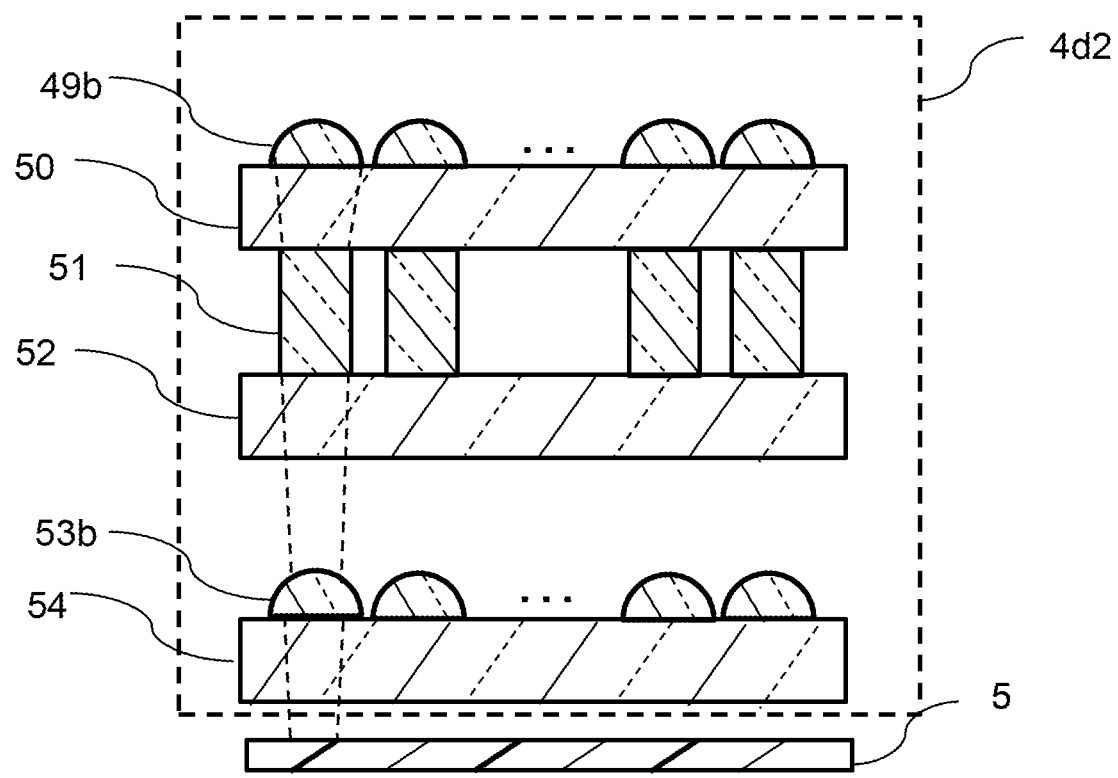
FIG. 11 is a schematic cross-sectional view of a first optical system 4d2 of the microscopic observation apparatus according to the modification of the fourth embodiment.

In the fourth embodiment, an example of controlling the traveling angle of the light in a direction in which the angle is narrowed by each lens is described, but the present invention is not limited to this. As shown in FIG. 11, the light may be guided by each lens. FIG. 11 is a schematic cross-sectional view of a first optical system 4*d*2 of the microscopic observation apparatus according to the modification of the fourth embodiment. Compared with the first optical system 4*d* of the fourth embodiment of FIG. 10, the first optical system 4*d*2 has a configuration in which the lens 49 is changed to a lens 49*b* and the lens 53 is changed to a lens 53*b*.

The lens 49*b* guides light rays including the fluorescence generated from the observation target T and part of the excitation light. The waveguide 51 guides light guided by the lens 49 and passing through the flat layer 50. The lens 53*b* guides the light passing through the waveguide 51 and the flat layer 52. The light guided by the lens 53 passes through the flat layer 54 and enters the filter 5. The optical characteristic of the lens 53*b* is set so that the incident angle of fluorescence on the filter 5 falls within the allowable range of the incident angle. As a result, the filter 5 can reduce the excitation light and transmit the fluorescence among light rays guided by the lens 53*b*.

Fifth Embodiment

Next, a fifth embodiment will be described. The microscopic observation apparatus according to the fifth embodiment has a different configuration of the first optical system from the microscopic observation apparatus according to the first embodiment.

Figure 12:
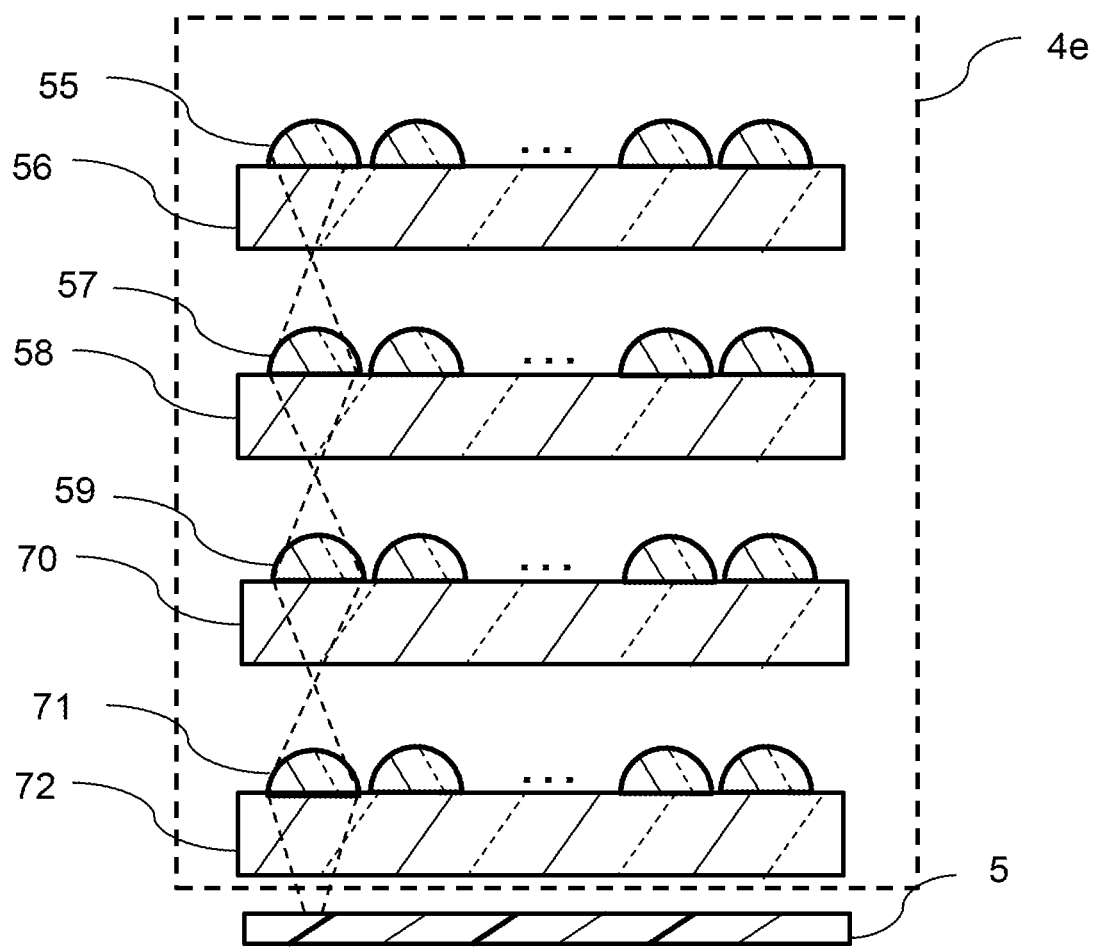
FIG. 12 is a schematic cross-sectional view of a first optical system 4e of the microscopic observation apparatus according to the fifth embodiment.

FIG. 12 is a schematic cross-sectional view of a first optical system 4*e* of the microscopic observation apparatus according to the fifth embodiment. As shown in FIG. 12, the first optical system 4*e* has a flat layer 56, a plurality of lenses 55 provided on the flat layer 56, a flat layer 58, a plurality of lenses 57 provided on the flat layer 58, a flat layer 70, a plurality of lenses 59 provided on the flat layer 70, a flat layer 72, and a plurality of lenses 71 provided on the flat layer 72.

The lens 55 controls the traveling angle of the light rays including the fluorescence generated from the observation target T and part of the excitation light in a narrowing direction. The lens 57 controls the traveling angle of light passing through the lens 55 and the flat layer 56 in a narrowing direction. The lens 59 controls the traveling angle of light passing through the lens 57 and the flat layer 58 in a narrowing direction. The lens 71 controls the traveling angle of light passing through the lens 59 and the flat layer 70 in a narrowing direction. As a result, the light enters the filter 5 through the lens 71 and the flat layer 72. The optical characteristics of the lens 71 are set so that the incident angle of fluorescence on the filter 5 falls within the allowable range of the incident angle. As a result, the filter 5 can reduce the excitation light and transmit the fluorescence among light rays controlled by the lens 71 in the direction of narrowing the traveling angle.

Modification of Fifth Embodiment

Figure 13:
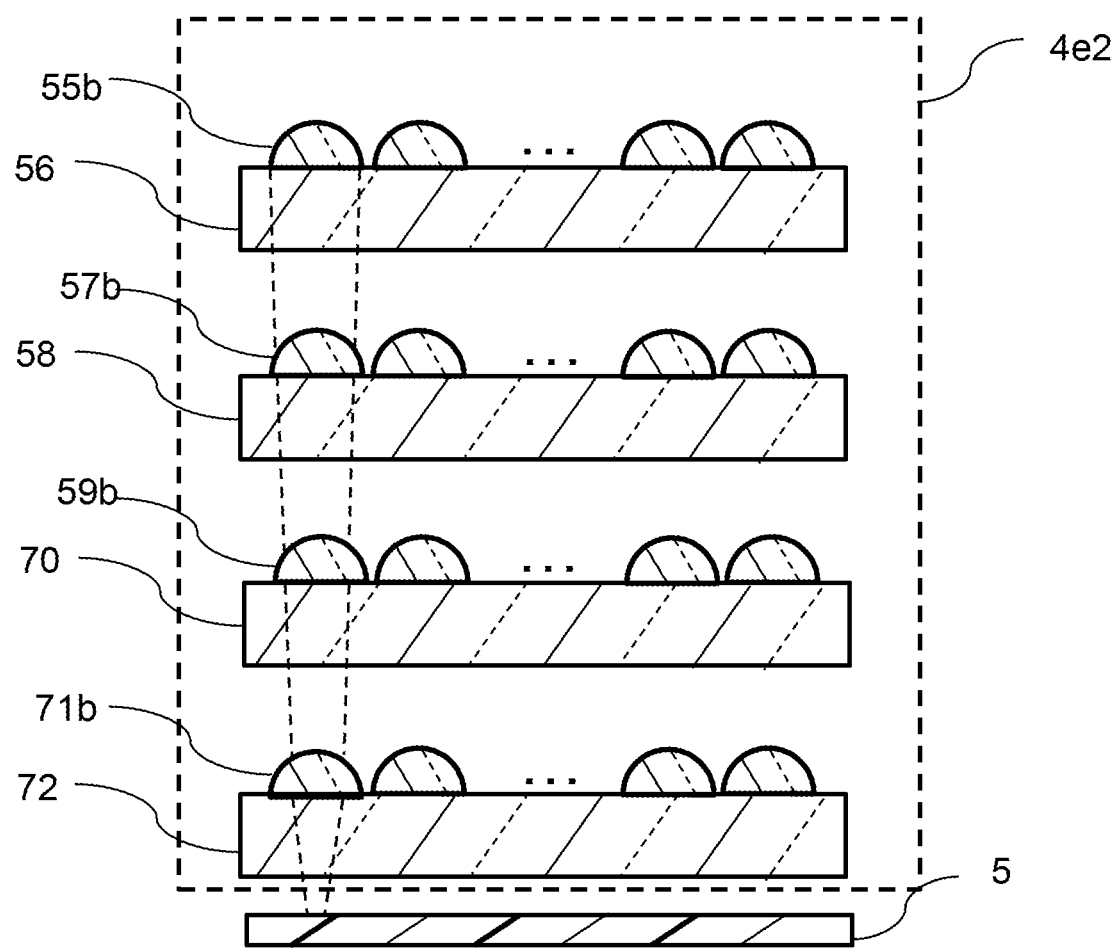
FIG. 13 is a schematic cross-sectional view of a first optical system 4e2 of the microscopic observation apparatus according to the modification of the fifth embodiment.

In the fifth embodiment, an example of controlling the traveling angle of the light in a direction in which the angle is narrowed by each lens is described, but the present invention is not limited to this. As shown in FIG. 13, the light may be guided by each lens. FIG. 13 is a schematic cross-sectional view of a first optical system 4*e*2 of the microscopic observation apparatus according to the modification of the fifth embodiment. Compared to the first optical system 4*e* of the fifth embodiment of FIG. 12, the first optical system 4*e*2 has a configuration in which the lens 55 is changed to a lens 55*b*, the lens 57 is changed to a lens 57*b*, the lens 59 is changed to a lens 59*b*, and the lens 71 is changed to a lens 71*b*.

The lens 55*b* guides light rays including the fluorescence generated from the observation target T and part of the excitation light.

The lens 57*b* guides the light that has been guided by the lens 55*b* and has passed through the flat layer 56.

The lens 59*b* guides the light that has been guided by the lens 57*b* and has passed through the flat layer 58.

The lens 71*b* guides the light that has been guided by the lens 59*b* and has passed through the flat layer 70.

The light guided by the lens 71*b* passes through the flat layer 72 and enters the filter 5. The optical characteristic the lens 71*b* is set so that the incident angle of fluorescence on the filter 5 falls within the allowable range of the incident angle. As a result, the filter 5 can reduce the excitation light and transmit the fluorescence among light rays guided by the lens 71*b*.

Modification

In each embodiment, the filter 5 is described as having an incident angle dependence in the optical characteristic as an example, but the present invention is not limited to this. The filter may have no incident angle dependence in the optical characteristic, and for example, may be filter glass. The filter glass has no incident angle dependence in the optical characteristic, but it has a feature that the pass/cut rises (or falls) gently.

In a case where the filter has no incident angle dependence in the optical characteristic, when observing the fluorescence distribution in the thickness direction of the observation target T, the first optical system in which the focal length of the first optical system toward the observation target is set so that the distance between the end of the first optical system toward the observation target and the observation target is away by the set distance or more is required. As a result, the fluorescence distribution of the observation target T in the thickness direction can be observed.

On the other hand, in a case where the filter has no incident angle dependence in the optical characteristic, when the fluorescence distribution in the thickness direction of the observation target T is not observed, the first optical system may be omitted. That is, the fluorescence detector may include at least a filter that reduces the intensity of light in the wavelength band of the excitation light among light rays including the fluorescence generated from the observation target T by radiating the excitation light from the light source and part of the excitation light, a second optical system that light-controls a plurality of light rays after passing through the filter, and a plurality of photoelectric conversion elements that converts the plurality of light rays light-controlled by the second optical system into electricity, and the optical characteristic of the second optical system may be set so that the angle of the light incident on the photoelectric conversion element falls within the set range.

According to this configuration, the filter can reduce the excitation light and transmit the fluorescence, and the sensitivity of the photoelectric conversion element is equal to or greater than the specified lower limit, so that the observation can be performed with high sensitivity. In addition, since the photoelectric conversion element converts the light light-controlled by the second optical system into electricity, there is no trade-off between field of view and magnification, unlike conventional optical microscopes, and when a plurality of photoelectric conversion elements is densely disposed, a wide field of view can be observed at high magnification. Therefore, the entire observation target can be easily observed with high sensitivity by utilizing the fluorescence from the observation target irradiated with the excitation light.

When at least part of the bottom of the placement member 2 is composed of a transparent member (for example, a bottle, a preparation, a flow path, etc.), the transparent member 3 may be omitted.

As described above, the present invention is not limited to the above embodiments as it is, and the constituent elements can be modified and materialized without departing from the gist thereof in the implementation stage. In addition, various inventions can be formed by appropriately combining a plurality of constituent elements disclosed in the above embodiments. For example, some constituent elements may be deleted from all the constituent elements shown in the embodiments. Further, the constituent elements of different embodiments may be appropriately combined.

REFERENCE SIGNS LIST

1 light source
2 placement member
3 transparent member
4, 4b, 4c, 4d, 4e first optical system
41 SELFOCK lens
42, 42b, 421, 43, 44 lens
45 flat layer
46 waveguide
47 flat layer
48 lens
49, 49b lens
5 filter
50 flat layer
51 waveguide
52 flat layer
53, 53b lens
54 flat layer
55, 55b lens
56 flat layer
57, 57b lens
58 flat layer
59, 59b lens
6, 6b second optical system
61 optical control member
62 viewing angle control layer
63, 63b, 631, 64, 64b lens
7 intermediate layer
71, 71b lens
72 flat layer
8 semiconductor substrate
9 photoelectric conversion element
10, 10b fluorescence detector
20 driving unit
46 waveguide
100 microscopic observation apparatus
200 logic circuit
300 display device
S microscopic observation system

The invention claimed is:

1. A microscopic observation apparatus that irradiates an observation target with excitation light to observe fluorescence generated from the observation target, the microscopic observation apparatus comprising:
   a light source that irradiates the observation target with excitation light;
   a first optical lens system in which a plurality of optical members are provided to control luminous flux by dividing the luminous flux into a plurality of physically separated light rays through the plurality of optical members, the luminous flux including fluorescence generated from the observation target by radiating the excitation light;
   a filter that reduces an intensity of light in a wavelength band of the excitation light among the plurality of physically separated light rays light-controlled by the first optical lens system;
   a plurality of optical control lens members that light-controls light that has passed through the filter;
   a plurality of viewing angle control lens layers on which light light-controlled by the plurality of optical control members is incident, that light-controls the incident light; and
   a plurality of photoelectric conversion elements light-controlled by the viewing angle control layers,
   wherein an optical characteristic of the viewing angle control lens layers is set so that angles of lights incident on the plurality of photoelectric conversion elements fall within a set range in which sensitivities of the plurality of photoelectric conversion elements is equal to or greater than a specified lower limit.

2. The microscopic observation apparatus according to claim 1, wherein the filter has an incident angle dependence in a first optical characteristic, and a second optical characteristic of the first optical lens system is set so that an incident angle of incident light on the filter falls at least within a range of an incident angle at which transmittance of excitation light is equal to or less than a specified upper limit.

3. The microscopic observation apparatus according to claim 1, wherein in the first optical lens system, a focal length of the first optical lens system toward the observation target is set so that a distance between an end of the first lens optical system toward the observation target and the observation target is away by a set distance or more.

4. The microscopic observation apparatus according to claim 1, further comprising:

a driving machine that moves the first optical lens system, the filter, and the photoelectric conversion element in a direction substantially perpendicular to incident faces of the plurality of photoelectric conversion elements while maintaining a relative positional relationship between the first optical system, the filter, and the plurality of photoelectric conversion elements.

5. The microscopic observation apparatus according to claim 1, wherein the filter is capable of electrically or mechanically controlling a wavelength characteristic of at least one of transmission, absorption, and reflection.

6. The microscopic observation apparatus according to claim 1,
wherein the first optical lens system controls a traveling angle of light so that the light narrows toward the filter, and an optical characteristic of the first optical lens system is set so that an incident angle of fluorescence in a targeted focus depth range of the observation target falls within a range of an incident angle, and an incident angle of fluorescence in a range other than the targeted focus depth range of the observation target does not fall within the range of the incident angle.

7. A microscopic observation method of irradiating an observation target with excitation light to observe fluorescence generated from the observation target, the microscopic observation method comprising:
irradiating the observation target with excitation light from a light source;
a plurality of optical members, which are provided in a first optical lens system, controlling luminous flux by dividing the luminous flux into a plurality of physically separated light rays through the plurality of optical members, the luminous flux including fluorescence generated from the observation target by radiating the excitation light;
a filter reducing an intensity of light in a wavelength band of the excitation light among light rays including fluorescence generated from the observation target by radiating the excitation light from a light source and part of the excitation light;
a plurality of optical control members light-controls light that has passed through the filter;
a plurality of viewing angle control lens layers on which light light-controlled by the plurality of optical control members is incident, that light-controls the incident light; and
a plurality of photoelectric conversion elements converting the plurality of physically separated light rays light-controlled by the viewing angle control layers into electricity,
wherein an optical characteristic of the viewing angle control lens layers is set so that angles of lights incident on the plurality of photoelectric conversion elements fall within a set range in which sensitivities of the plurality of photoelectric conversion elements is equal to or greater than a specified lower limit.

* * * * *